Patented Feb. 23, 1932

1,846,581

UNITED STATES PATENT OFFICE

WALTER NORTH BOYES, OF EPSOM, AUCKLAND, NEW ZEALAND

PROCESS OF MANUFACTURING CEREAL MEALS

No Drawing. Application filed March 7, 1929, Serial No. 345,245, and in New Zealand April 24, 1928.

This invention relates to the production of cereal meals from grain such as oats, wheat, rice, rye, maize or barley, the object of the invention being the production of a new meal which requires no cooking by the purchaser, is malted, inasmuch as portion of the starch content of the grain is converted to maltose or malt sugar, and is considerably pre-digested.

Cereal meals in use at present such as oatmeal require cooking when being made into porridge for human consumption and although it is often considered that a short period of cooking is sufficient, to make the porridge readily digestible, it should be cooked slowly for a considerable period and stirred continually.

The meal produced by my process requires no further cooking and in the preparation of porridge from oatmeal, the meal is placed in a basin and mixed with cold water to a stiff dough.

By then adding boiling water and stirring, porridge is produced similar to that existing, but in addition having maltose content and being to a great extent pre-digested.

According to my invention the objects described are attained by the process I will now describe.

The grain is conveniently cleaned in any usual known manner such as on grain cleaning machines as are used in flour and the like mills, and is then finally cleaned by air washing which removes all the light loose matter such as dust fibres and the like.

The clean grain is then placed into a suitable cooking or digesting machine of any known type, an airtight vessel in which the grain is subjected to steam at a pressure of from 4 to 6 lbs. per square inch.

The grain is cooked or digested for a period of two to two and a half hours, samples being drawn from time to time to determine the steam pressure required, the cooking having the effect of expanding the grain, bursting some of the starch cells, and converting some of the starch into dextrin, a portion of the latter being itself converted into maltose or malt sugar.

With the cooking of some of the harder grains such as maize or barley the steam pressure may have to be raised as high as 15 lbs. per square inch this being determined by samples extracted during the process of cooking.

The grain having been cooked for the necessary time, it is removed from the cooker or digester and conditioned by being allowed to cool down to about 60 degrees Fahr. this being for the purpose of preventing stickiness of the grain in the further stages of the process.

To the grain is then added and well mixed therewith substantially six per cent of chloride of sodium, the grain being then placed into an oven, kiln or the like wherein it is dried and baked at a temperature of from 135 to 145 degrees Fahr. for a period of one and a quarter to one and three quarter hours, samples being drawn from time to time for examination.

The baking and drying being completed the grain is removed from the oven, kiln or the like, and again conditioned or cooled down to about 60 degrees Fahr. to prevent sweating during the further stages of the process.

The grain is then suitably ground by any suitable means such as an attrition mill from which the meal produced is passed through a bolter or sifter, clothed with wire or silk gauze having about 32 threads per lineal inch, the overtails which will not pass through the latter being passed through smooth rolls without differential speed after which the overtails are in condition for mixing with the meal which has gone through the bolter or sifter.

The meal is then ready for packing into cartons or bags for dispatch to the retailers or the like.

The meal is particularly for use in the preparation of porridge and the like but it is also suitable for invalid or infant foods and for flour for preparation of special biscuits etc.

Claims:

1. A process of producing cereal meals comprising cooking previously cleaned and air washed grain in a digester or cooker for a period of from two to two and a half hours, and at a pressure of from 4 to 6 lbs. per square inch for soft grain and up to 15 lbs. per square inch for hard grain, conditioning said grain by cooling down to a temperature of about 60 degrees Fahr., mixing with said grain substantially six per cent. of chloride of sodium, drying and baking said grain for a period of one and a quarter to one and three quarter hours at temperature of from 135 to 145 degrees Fahr., conditioning said grain after baking by allowing same to cool down to about 60 degrees Fahr. suitably grinding said grain and sifting the meal thus produced.

2. A process of producing cereal meals as claimed in claim 1 wherein the overtails are rolled and mixed with the meal previously sifted.

In testimony whereof I affix my signature.

WALTER NORTH BOYES.